United States Patent
Yang et al.

(10) Patent No.: US 11,683,384 B2
(45) Date of Patent: Jun. 20, 2023

(54) NOTIFICATIONS FOR A SUBSCRIPTION TO NETWORK FUNCTION (SERVICE) PROFILE CHANGE

(71) Applicant: Telefonaktiebolaget LM Ericsson (publ), Stockholm (SE)

(72) Inventors: Yong Yang, Kållered (SE); Jesus-Angel de-Gregorio-Rodriguez, Madrid (ES); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/282,802

(22) PCT Filed: Sep. 10, 2019

(86) PCT No.: PCT/EP2019/074128
§ 371 (c)(1),
(2) Date: Apr. 5, 2021

(87) PCT Pub. No.: WO2020/069825
PCT Pub. Date: Apr. 9, 2020

(65) Prior Publication Data
US 2021/0392197 A1     Dec. 16, 2021

Related U.S. Application Data

(60) Provisional application No. 62/741,211, filed on Oct. 4, 2018.

(51) Int. Cl.
*H04L 43/16* (2022.01)
*H04L 67/306* (2022.01)
*H04L 67/55* (2022.01)

(52) U.S. Cl.
CPC ........... *H04L 67/306* (2013.01); *H04L 43/16* (2013.01); *H04L 67/55* (2022.05)

(58) Field of Classification Search
None
See application file for complete search history.

(56) References Cited

U.S. PATENT DOCUMENTS

| 11,096,046 B2* | 8/2021 | Li | H04W 36/14 |
| 2016/0277953 A1* | 9/2016 | Andersson | H04L 65/80 |

(Continued)

FOREIGN PATENT DOCUMENTS

CN       102263810 A      11/2011

OTHER PUBLICATIONS

Author Unknown, "3rd Generation Partnership Project; Technical Specification Group Services and System Aspects; Study on Architecture for Next Generation System (Release 14)," 3GPP TR 23.799 V14.0.0, Dec. 2016, 3GPP Organizational Partners, 522 pages.

(Continued)

*Primary Examiner* — James A Edwards
(74) *Attorney, Agent, or Firm* — Withrow & Terranova, PLLC

(57) ABSTRACT

Disclosed herein is a method, performed by a repository network entity within a telecommunications network, for providing notifications for a subscription to monitor changes of a NF profile of a monitored network entity. The method comprises: receiving, from a subscribing network entity, a subscription request to subscribe to monitor changes to a NF profile of at least one monitored network entity, the request comprising a notification preference that identifies a subset of attributes in the NF profile to be monitored or to be excluded from monitoring; and providing to the subscribing network entity, notifications of changes to the identified subset of attributes of the NF profile of the at least one monitored network entity.

18 Claims, 7 Drawing Sheets

AT A NETWORK ENTITY FOR PROVIDING NOTIFICATIONS FOR A SUBSCRIPTION TO MONITOR CHANGES OF A NF PROFILE, RECEIVE, FROM A SUBSCRIBING ENTITY, A REQUEST TO SUBSCRIBE TO MONITOR CHANGES OF A NF PROFILE OF AT LEAST ONE NF ENTITY, THE REQUEST COMPRISING A NOTIFICATION PREFERENCE THAT IDENTIFIES A SUBSET OF ATTRIBUTES IN THE NF PROFILE TO BE MONITORED OR TO BE EXCLUDED FROM MONITORING (AND, OPTIONALLY, A SET OF CONDITIONS WHICH MUST BE SATISFIED BEFORE NOTIFICATION OF THE CHANGE TO THE NF PROFILE IS TO BE SENT)
IVD100

PROVIDE, TO THE SUBSCRIBING ENTITY, NOTIFICATIONS OF CHANGES TO THE IDENTIFIED SUBSET OF ATTRIBUTES OF THE NF PROFILE OF THE AT LEAST ONE NF ENTITY ACCORDING TO THE NOTIFICATION PREFERENCE
IVD102

(56) References Cited

U.S. PATENT DOCUMENTS

2018/0270778 A1* 9/2018 Bharatia ............. H04L 65/1073
2018/0357238 A1* 12/2018 Cowan ............. G06F 16/24578

OTHER PUBLICATIONS

Author Unknown, "3rd Generation Partnership Project; Technical Specification Group Services and System Aspects; Service requirements for the 5G system; Stage 1 (Release 15)," 3GPP TS 22.261 V2.0.0, Mar. 2017, 3GPP Organizational Partners, 48 pages.

Author Unknown, "3rd Generation Partnership Project; Technical Specification Group Services and System Aspects; System Architecture for the 5G System; Stage 2 (Release 15)," 3GPP TS 23.501 V15.3.0, Sep. 2018, 3GPP Organizational Partners, 226 pages.

Author Unknown, "3rd Generation Partnership Project; Technical Specification Group Services and System Aspects; Procedures for the 5G System; Stage 2 (Release 15)," 3GPP TS 23.502 V15.3.0, Sep. 2018, 3GPP Organizational Partners, 330 pages.

Author Unknown, "3rd Generation Partnership Project; Technical Specification Group Core Network and Terminals; 5G System; Network Function Repository Services; Stage 3 (Release 15)," 3GPP TS 29.510 V15.1.0, Sep. 2018, 3GPP Organizational Partners, 84 pages.

Author Unknown, "3rd Generation Partnership Project; Technical Specification Group Core Network and Terminals; 5G System; Network Function Repository Services; Stage 3 (Release 15)," 3GPP TS 29.510 V15.3.0, Mar. 2019, 3GPP Organizational Partners, 121 pages.

Ericsson, "C4-187xyz: NRF Notifications," Change Request, 29.510 V15.1.0, Sep. 18, 2018, 3GPP TSG CT WG4 Meeting #86-bis, Oct. 15-19, 2018, Vilnius, Lithuania, 19 pages.

International Search Report and Written Opinion for International Patent Application No. PCT/EP2019/074128, dated Nov. 28, 2019, 11 pages.

Examination Report for Indian Patent Application No. 202147019899, dated Feb. 16, 2022, 5 pages.

* cited by examiner

AT A NETWORK ENTITY FOR PROVIDING NOTIFICATIONS FOR A SUBSCRIPTION TO MONITOR CHANGES OF A NF PROFILE, RECEIVE, FROM A SUBSCRIBING ENTITY, A REQUEST TO SUBSCRIBE TO MONITOR CHANGES OF A NF PROFILE OF AT LEAST ONE NF ENTITY, THE REQUEST COMPRISING A NOTIFICATION PREFERENCE THAT IDENTIFIES A SUBSET OF ATTRIBUTES IN THE NF PROFILE TO BE MONITORED OR TO BE EXCLUDED FROM MONITORING (AND, OPTIONALLY, A SET OF CONDITIONS WHICH MUST BE SATISFIED BEFORE NOTIFICATION OF THE CHANGE TO THE NF PROFILE IS TO BE SENT)
IVD100

↓

PROVIDE, TO THE SUBSCRIBING ENTITY, NOTIFICATIONS OF CHANGES TO THE IDENTIFIED SUBSET OF ATTRIBUTES OF THE NF PROFILE OF THE AT LEAST ONE NF ENTITY ACCORDING TO THE NOTIFICATION PREFERENCE
IVD102

*FIG. 4a*

AT A NETWORK ENTITY FOR SUBSCRIBING TO NOTIFICATIONS OF CHANGES OF A NF PROFILE, SEND, TO A NETWORK ENTITY FOR PROVIDING NOTIFICATIONS OF PROFILE CHANGES OF A NF ENTITY, A REQUEST TO SUBSCRIBE TO MONITORING CHANGES OF A NF PROFILE OF AT LEAST ONE NF ENTITY, THE REQUEST COMPRISING A NOTIFICATION PREFERENCE THAT IDENTIFIES A SUBSET OF ATTRIBUTES IN THE NF PROFILE TO BE MONITORED OR TO BE EXCLUDED FROM MONITORING (AND, OPTIONALLY, A SET OF CONDITIONS WHICH MUST BE SATISFIED BEFORE NOTIFICATION OF THE CHANGE TO THE NF PROFILE IS TO BE SENT)
IVD200

↓

RECEIVE, FROM THE NETWORK ENTIRY, NOTIFICATIONS OF CHANGES TO THE IDENTIFIED SUBSET OF ATTRIBUTES IN THE NF PROFILE OF THE AT LEAST ONE NF ENTITY ACCORDING TO THE NOTIFICATION PREFERENCE
IVD202

*FIG. 4b*

Figure 5.2.2.5.2-1: Subscription to NF Instances in the same PLMN

NOTIFICATIONS FOR A SUBSCRIPTION TO NETWORK FUNCTION (SERVICE) PROFILE CHANGE

This application is a 35 U.S.C. § 371 national phase filing of International Application No. PCT/EP2019/074128, filed Sep. 10, 2019, which claims the benefit of U.S. Provisional Application No. 62/741,211, filed Oct. 4, 2018, the disclosures of which are incorporated herein by reference in their entireties.

TECHNICAL FIELD

This disclosure relates to a method a for providing conditional notifications for a subscription to monitor changes of a NF profile of an NF entity.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

FIG. 1 illustrates an example of a cellular communications network QQ100 wherein embodiments of the present disclosure can be implemented. In the embodiments described herein, the cellular communications network QQ100 is a Fifth Generation (5G) New Radio (NR) network. In this example, the cellular communications network QQ100 includes base stations QQ102-1 and QQ102-2, which in Long Term Evolution (LTE) are referred to as evolved or enhanced Node Bs (eNBs) and in 5G NR are referred to as NR Base Stations (gNBs), controlling corresponding macro cells QQ104-1 and QQ104-2. The base stations QQ102-1 and QQ102-2 are generally referred to herein collectively as base stations QQ102 and individually as base station QQ102. Likewise, the macro cells QQ104-1 and QQ104-2 are generally referred to herein collectively as macro cells QQ104 and individually as macro cell QQ104. The cellular communications network QQ100 may also include a number of low power nodes QQ106-1 through QQ106-4 controlling corresponding small cells QQ108-1 through QQ108-4. The low power nodes QQ106-1 through QQ106-4 can be small base stations (such as pico or femto base stations) or Remote Radio Heads (RRHs), or the like. Notably, while not illustrated, one or more of the small cells QQ108-1 through QQ108-4 may alternatively be provided by the base stations QQ102. The low power nodes QQ106-1 through QQ106-4 are generally referred to herein collectively as low power nodes QQ106 and individually as low power node QQ106. Likewise, the small cells QQ108-1 through QQ108-4 are generally referred to herein collectively as small cells QQ108 and individually as small cell QQ108. The base stations QQ102 (and optionally the low power nodes QQ106) are connected to a core network QQ110.

The base stations QQ102 and the low power nodes QQ106 provide service to wireless devices QQ112-1 through QQ112-5 in the corresponding cells QQ104 and QQ108. The wireless devices QQ112-1 through QQ112-5 are generally referred to herein collectively as wireless devices QQ112 and individually as wireless device QQ112. The wireless devices QQ112 are also sometimes referred to herein as UEs.

A Network Function (NF) is a functional building block within a network infrastructure and has well-defined external interfaces and a well-defined functional behavior.

FIG. 2 illustrates a wireless communication system represented as a 5G network architecture composed of core NFs, where interaction between any two NFs is represented by a point-to-point reference point/interface. FIG. 2 can be viewed as one particular implementation of the system QQ100 of FIG. 1.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the (R)AN comprises base stations, e.g., such as eNBs or gNBs, or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and User Plane Function (UPF) are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating the user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that an NF provides to other authorized NFs can be exposed to the authorized NFs through the service-based interface. In FIG. 3 the service based interfaces are indicated by the letter "N" followed by the name of the NF, e.g., Namf for the service based interface of the AMF and Nsmf for the service based interface of the SMF, etc. The Network Exposure Function (NEF) and the NF Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure. NRF The 5G NRF provides or supports the following functionality:

It maintains the NF profiles of available NF instances and their supported services;

It allows other NF instances to subscribe to, and get notified about, the registration in NRF of new NF instances of a given type;

It supports the service discovery function: it receives NF discovery requests from NF instances, and provides the information of the available NF instances fulfilling certain criteria (e.g., supporting a given service).

One important function of the NRF is to allow other NF instances to subscribe to, and get notified about, the registration in NRF of new NF instances of a given type; and this function is further extended as below as specified in section 5.2.2.5 of Third Generation Partnership Project (3GPP) Technical Specification (TS) 29.510, Version 15.1.0 (hereinafter, "TS 29.510"), which states that an NRF can:

Create a subscription so that an NF Service Consumer—which itself may be another NF instance—can request to be notified when NF Instances of a given set, following certain filter criteria are registered/deregistered in NRF or when their profile is modified;

Create a subscription to a specific NF instance so an NF service consumer can request to be notified when the profile of such NF instance is modified or when the NF instance is deregistered from NRF.

A profile of an NF instance is considered to have been modified whenever any parameter of the profile has been changed.

There currently exist certain challenge(s). The conventional subscription mechanism allows the subscribing entity to be notified of changes to NF instances of a given set or changes to a specific NF instance, but one problem is that an NF Service profile contains many profile parameters. For example, as shown by attribute names or named attributes in the tables 6.1.6.2.2-1 (NF), 6.1.6.2.11-1 (AMF), 6.1.6.2.12-1 (SMF), 6.1.6.2.20-1 (PCF), 6.1.6.2.16-1 and 6.1.6.3.6-1 below, taken from TS 29.510. Under the conventional subscription mechanism, the subscribing entity is notified every time that even just one of the many profile parameters/attributes change. As used herein, the terms "parameter" and "attribute" are synonymous unless explicitly stated otherwise. Likewise, "parameter name" and "attribute name" are synonymous with each other, "profile parameter" and "profile attribute" are synonymous with each other, and so on, unless explicitly stated otherwise.

TABLE 6.1.6.2.2-1

Definition of type NFProfile
Begin excerpts from TS 29.510

| Attribute name | Data type | P | Cardinality | Description |
| --- | --- | --- | --- | --- |
| nfInstanceID | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) |
| plmn | PlmnId | O | 0 . . . 1 | PLMN of the Network Function |
| sNssais | array(Snssai) | O | 0 . . . N | S-NSSAIs of the Network Function |
| nsiList | array(string) | O | 0 . . . N | NSI identities of the Network Function |
| fqdn | Fqdn | C | 0 . . . 1 | FQDN of the Network Function (NOTE 1, NOTE 2). For AMF the FQDN registered with the NRF shall be that of the AMF Name (see 3GPP TS 23.003 [12] subclause 28.3.2.5). |

TABLE 6.1.6.2.2-1-continued

Definition of type NFProfile
Begin excerpts from TS 29.510

| Attribute name | Data type | P | Cardinality | Description |
|---|---|---|---|---|
| interPlmnFqdn | Fqdn | C | 0...1 | If the NF needs to be discoverable by other NFs in a different PLMN, then an FQDN that is used for inter PLMN routing as specified in 3GPP TS 23.003 [12] shall be registered with the NRF. |
| ipv4Addresses | array(Ipv4Addr) | C | 0...N | IPv4 address(es) of the Network Function (NOTE 1, NOTE 2) |
| ipv6Addresses | array(Ipv6Addr) | C | 0...N | IPv6 address(es) of the Network Function (NOTE 1, NOTE 2) |
| priority | integer | O | 0...1 | Priority (relative to other NFs of the same type) in the range of 0-65535, to be used for NF selection; lower values indicate a higher priority. If priority is also present in the nfServiceList parameters, those will have precedence over this value. (See NOTE 4). The NRF may overwrite the received priority value when exposing an NFProfile with the Nnrf_NFDiscovery service. |
| capacity | integer | O | 0...1 | Static capacity information in the range of 0-65535, expressed as a weight relative to other NF instances of the same type; if capacity is also present in the nfServiceList parameters, those will have precedence over this value. (See NOTE 4). |
| load | integer | O | 0...1 | Dynamic load information, ranged from 0 to 100, indicates the current load percentage of the NF. |
| locality | string | O | 0...1 | Operator defined information about the location of the NF instance (e.g. geographic location, data center) (NOTE 3) |
| udrInfo | UdrInfo | O | 0...1 | Specific data for the UDR (ranges of SUPI, group ID . . .) |
| udmInfo | UdmInfo | O | 0...1 | Specific data for the UDM (ranges of SUPI, group ID . . .) |
| ausfInfo | AusfInfo | O | 0...1 | Specific data for the AUSF (ranges of SUPI, group ID . . .) |
| amfInfo | AmfInfo | O | 0...1 | Specific data for the AMF (AMF Set ID, . . .) |
| smfInfo | smfInfo | O | 0...1 | Specific data for the SMF (DNN's, . . .) |
| upfInfo | UpfInfo | O | 0...1 | Specific data for the UPF (S-NSSAI, DNN, SMF serving area, interface . . .) |
| pcfInfo | PcfInfo | O | 0...1 | Specific data for the PCF |
| bsfInfo | BsfInfo | O | 0...1 | Specific data for the BSF |
| customInfo | object | O | 0...1 | Specific data for custom Network Functions |
| recoveryTime | DateTime | O | 0...1 | Timestamp when the NF was (re)started (NOTE 5, NOTE 6) |
| nfServices | array(NFService) | O | 0...N | List of NF Service Instances |

(NOTE 1):
At least one of the addressing parameters (fqdn, ipv4address or ipv6adress) shall be included in the NF Profile.
(NOTE 2):
If the type of Network Function is UPF, the addressing information is for the UPF N4 interface.
(NOTE 3):
A requester NF may use this information to select a NF instance (e.g. a NF instance preferably located in the same data center).
(NOTE 4):
The capacity and priority parameters, if present, are used for NF selection and load balancing. The priority and capacity attributes shall be used for NF selection in the same way that priority and weight are used for server selection as defined in IETF RFC 2782 [23].
(NOTE 5):
The NRF shall notify NFs subscribed to receiving notifications of changes of the NF profile, if the NF recoveryTime or the nfStatus is changed. See subclause 6.2 of 3GPP TS 23.527 [27].
(NOTE 6):
A requester NF may consider that all the resources created in the NF before the NF recovery time have been lost. This may be used to detect a restart of a NF and to trigger appropriate actions, e.g. release local resources. See subclause 6.2 of 3GPP TS 23.527 [27].

TABLE 6.1.6.2.11-1

Definition of type AmfInfo

| Attribute name | Data type | P | Cardinality | Description |
|---|---|---|---|---|
| amfRegionId | string | M | 1 | AMF region identifier |
| amfSetId | string | M | 1 | AMF set identifier. |
| guamiList | array(Guami) | M | 1...N | List of supported GUAMIs |
| taiList | array(Tai) | O | 0...N | The list of TAIs the AMF can serve. It may contain the non-3GPP access TAI. The absence of this attribute and the taiRangeList attribute indicate that the AMF can be selected for any TAI in the serving network. |

TABLE 6.1.6.2.11-1-continued

Definition of type AmfInfo

| Attribute name | Data type | P | Cardinality | Description |
|---|---|---|---|---|
| taiRangeList | array(TaiRange) | O | 0...N | The range of TAIs the AMF can serve. The absence of this attribute and the taiList attribute indicate that the AMF can be selected for any TAI in the serving network. |
| backupInfoAmfFailure | array(Guami) | O | 0...N | List of GUAMIs for which the AMF acts as a backup for AMF failure |
| backupInfoAmfRemoval | array(Guami) | O | 0...N | List of GUAMIs for which the AMF acts as a backup for planned AMF removal |
| n2InterfaceAmfInfo | N2InterfaceAmfInfo | O | 0...1 | N2 interface information of the AMF. This information needs not be sent in NF Discovery responses. It may be used by the NRF to update the DNS for AMF discovery by the 5G Access Network. The procedures for updating the DNS are out of scope of this specification. |

TABLE 6.1.6.2.12-1

Definition of type SmfInfo

| Attribute name | Data type | P | Cardinality | Description |
|---|---|---|---|---|
| dnnList | array(Dnn) | M | 1...N | DNNs supported by the SMF |
| taiList | array(Tai) | O | 0...N | The list of TAIs the SMF can serve. It may contain the non-3GPP access TAI. The absence of this attribute and the taiRangeList attribute indicate that the SMF can be selected for any TAI in the serving network. |
| taiRangeList | array(TaiRange) | O | 1...N | The range of TAIs the SMF can serve. It may contain the non-3GPP access' TAI. The absence of this attribute and the taiList attribute indicate that the SMF can be selected for any TAI in the serving network. |
| pgwFqdn | Fqdn | O | 0...1 | The FQDN of the PGW if the SMF is a combined SMF/PGW-C. |

TABLE 6.1.6.2.20-1

Definition of type PcfInfo

| Attribute name | Data type | P | Cardinality | Description |
|---|---|---|---|---|
| dnnList | array(Dnn) | O | 1...N | DNNs supported by the PCF |
| supiRangeList | array(SupiRange) | O | 1...N | List of ranges of SUPIs that can be served by the PCF instance. If not provided, the PCF can serve any SUPI. |

TABLE 6.1.6.2.16-1

Definition of type SubscriptionData

| Attribute name | Data type | P | Cardinality | Description |
|---|---|---|---|---|
| nfStatusNotificationUri | Uri | M | 1 | Callback URI where the NF Service Consumer will receive the notifications from NRF. |
| subscriptionId | string | C | 0...1 | Subscription ID for the newly created resource. This parameter shall only be included by NRF in the response to the subscription creation request.<br>Read-Only: true |
| validityTime | DateTime | C | 0...1 | Time instant after which the subscription becomes invalid. This parameter may be sent by the client, as a hint to the server, but it shall be always sent back by the server (regardless of the presence of the attribute in the request) in the response to the subscription creation request. |
| reqNotifEvents | array(NotificationEventType) | O | 0...N | If present, this attribute shall contain the list of event types that the NF Service Consumer is interested in receiving.<br>If this attribute is not present, it means that notifications for all event types are requested. |

TABLE 6.1.6.2.16-1-continued

Definition of type SubscriptionData

| Attribute name | Data type | P | Cardinality | Description |
|---|---|---|---|---|
| nfInstanceId | NfInstanceId | C | 0 ... 1 | If present, this attribute contains the NF Instance ID of a specific NF Instance, whose status is requested to be monitored. If this attribute is present, "nfType", "serviceName", "amfRegionId", "amfSetId" and "guamiList" shall be absent. |
| nfType | NFType | C | 0 ... 1 | If present, this attribute contains the NF type of the NFs whose status is requested to be monitored. If this attribute is present, "nfInstanceId" shall be absent. |
| serviceName | ServiceName | C | 0 ... 1 | If present, this attribute contains the service name of those NFs that offer such service, whose status is requested to be monitored. If this attribute is present, "nfInstanceId" shall be absent. |
| amfRegionId | string | C | 0 ... 1 | If present, this attribute contains the AMF region identifier of the NFs whose status is requested to be monitored. If this attribute is present, "nfInstanceId" shall be absent. |
| amfSetId | string | C | 0 ... 1 | If present, this attribute contains the AMF set identifier of those NFs having a certain "AMF Set ID" attribute in their profile, whose status is requested to be monitored. If this attribute is present, "nfInstanceId" shall be absent. |
| guamiList | array(Guami) | C | 0 ... N | If present, this attribute contains the GUAMI(s) of the AMFs whose status is requested to be monitored. If this attribute is present, "nfInstanceId" shall be absent. |
| plmnId | PlmnId | O | 0 ... 1 | If present, this attribute contains the target PLMN ID of the NF Instance(s) whose status is requested to be monitored. |

NOTE 1:
At least one of the subscription conditions (nfInstanceID, nfType, serviceName, amfRegionId, amfSetId or guamiList) shall be present in the SubscriptionData object.
NOTE 2:
If both the amfRegionId and amfSetId attributes are present in the SubscriptionData, this indicates a subscription for notifications satisfying both attributes (i.e. notifications for NFs from that amfRegionId and amfSetId).

TABLE 6.1.6.3.6-1

Enumeration NotificationEventType

| Enumeration value | Description |
|---|---|
| "NF_REGISTERED" | The NF Instance has been registered in NRF |
| "NF_DEREGISTERED" | The NF Instance has been deregistered from NRF |
| "NF_PROFILE_CHANGED" | The profile of the NF Instance has been modified |

End Excerpts from TS 29.510

As can be seen from the exemplifying tables above, there can be a significant number of profile parameters associated with the NF profile of an NF instance.

SUMMARY

It is quite often that when an NF service consumer subscribes to the NRF for information regarding an NF service provider, the NF service consumer is not interested in all of the possible attributes (i.e., all possible profile parameters) and instead interested in some subset of those possible attributes. That subset of attributes of interest may differ depending on what the NF service consumer is or does. These differences may be due to its role in the Service Based Interface (SBI), e.g., whether it is a service consumer of the NF for which it is subscribing, or due to different 3GPP functionalities.

For example, when an SMF subscribes to receive notifications of an NF profile change for an AMF, the SMF would, from a service consumer point of view, likely want to be notified if there is a change to some parameters (such as backupInfoAmfFailure and/or backupInfoAmfRemoval), but would not have any particular interest in a change to other parameters (such as taiList or n2InterfaceAmfInfo). An SMF generally has no interest in being notified if the locality or priority of the AMF has been changed, since there is no AMF selection from an SMF. Yet under conventional standards (e.g., TS 29.510) the SMF would be notified of a change to any of the AMF profile parameters, including changes to those parameters in which the SMF has no interest.

In another example, both an AMF and a SMF may consume services provided by a PCF, but may not be interested in the same parameters of the PCF. The parameter supiRangeList is of little to no interest to an SMF, and the parameter dnnList may or may not be of interest to an AMF, depending upon the selection logic of the AMF. Normally, when an AMF gets the mobility policy for a UE, the supiRangeList parameter is more interesting to the AMF. Yet, under conventional standards, an AMF or SMF that is subscribed to be notified to changes of the PCF parameters will be notified of changes to any of the PCF profile parameters, including changes to those parameters which are of no interest to the AMF or SMF, respectively.

Even for parameters that may be of interest to an NF service consumer, the NF service consumer may desire to be notified of a change to a parameter only if the change to the parameter of interest meets one or more criteria. For example, some attributes in an NF profile may have a continuous value range (e.g., load information may be indicated as having a value between 0 and 100%); an entity that is monitoring the percentage load of an NF provider is likely not interested in receiving notifications every time the load value changes, but is more likely to want to be notified if the load being experienced by the NF provider exceeds a threshold value or percentage, or experiences a change that is larger than a threshold value or percentage. For example, an NF consumer may want to be notified if the load of the NF provider changes by 5%, if the load exceeds 90%, or if the load drops below a certain value, and so on.

As currently defined in TS 29.510, it is not possible to provide a filter for the changes when subscribing to an NF profile change, e.g., to be notified only if one of a first subset of parameters change but to not be notified if any of another subset of parameters change, etc. It is also not possible to provide a threshold condition for notification of changes to parameters that are of interest to the NF consumer.

Thus, in conventional telecommunications networks, it is not possible to provide notification to the subscribing NF consumer only when a particular attribute has been changed and/or when a particular attribute has reached a threshold value or has changed by a threshold amount.

Certain aspects of the present disclosure and their embodiments may provide solutions to the aforementioned or other challenges.

The present disclosure proposes a mechanism, in the 5G Core with Service Based Architecture (SBA), in which an NF subscribes to the NRF to get notifications for the change of another NF's profile.

A first embodiment of the present solution is directed to a method, performed by a repository network entity within a telecommunications network, for providing notifications for a subscription to monitor changes of a Network Function, NF, profile of a monitored network entity. The method comprises: receiving, from a subscribing network entity, a subscription request to subscribe to monitor changes to a NF profile of at least one monitored network entity, the request comprising a notification preference that identifies a subset of attributes in the NF profile to be monitored or to be excluded from monitoring; and providing, to the subscribing network entity, notifications of changes to the identified subset of attributes of the NF profile of the at least one monitored network entity.

Another embodiment of the present solution is directed to a method, performed by a subscribing network entity within a telecommunications network, for subscribing to notifications of changes of a Network Function, NF, profile of a monitored network entity. The method comprises: sending, to a repository network entity, a subscription request to subscribe to monitor changes to a NF profile of at least one monitored network entity, the request comprising a notification preference that identifies a subset of attributes of the NF profile to be monitored or to be excluded from monitoring; and receiving, from the repository network entity, notifications of changes to the identified subset of profile attributes of the NF profile of the at least one monitored network entity.

Another embodiment of the present solution is directed to a repository network entity for operating within a telecommunications network and for providing notifications for a subscription to monitor changes of a Network Function, NF, profile of a monitored network entity, the repository network entity comprising processing circuitry configured to perform the steps of: receive, from a subscribing network entity (1100), a subscription request to subscribe to monitor changes to a NF profile of at least one monitored network entity, the request comprising a notification preference that identifies a subset of attributes in the NF profile to be monitored or to be excluded from monitoring; and provide, to the subscribing network entity, notifications of changes to the identified subset of attributes of the NF profile of the at least one monitored network entity.

Another embodiment of the present solution is directed to a subscribing network entity for operating within a telecommunications network and for subscribing to notifications of changes of a Network Function, NF, profile of a monitored network entity, the subscribing network entity comprising processing circuitry configured to perform the steps of: send, to a repository network entity, a subscription request to subscribe to monitor changes to a NF profile of at least one monitored network entity, the request comprising a notification preference that identifies a subset of attributes in the NF profile to be monitored or to be excluded from monitoring; and receive, from the repository network entity, notifications of changes to the identified subset of attributes of the NF profile of the at least one monitored network entity.

In some embodiments, a subscribing NF provides filter conditions for the subscription data, so that the NRF will send a notification towards the subscribing NF only when any the attributes of interest to the subscribing NF have been changed, or when any of the attributes of interest to the subscribing NF have been changed according to a certain metric or condition (e.g., changed by a threshold percentage, changed to a threshold value, changed to be above or below a threshold value, and so on).

In one embodiment, a new attribute, which may be called, for example, monitoredAttributeList, is added to the SubscriptionData object, where the monitoredAttributeList includes a list of attributes of target NF based on its interest. Likewise, a new attribute, which may be called, for example, unmonitoredAttributeList, may include a list of attributes of the target NF which are not of interest to the subscribing entity.

In some embodiments, another new attribute, which may be called, for example, changeFilterList, is added to the SubscriptionData object. This attribute allows the subscribing entity to specify one or more conditions under which a change to one or more parameters triggers a notification to the subscribing entity. For example, for those attributes that have multiple values, a condition may include at least the following possibilities:

When an attribute has discrete values, such as when the attribute is a Boolean, string, etc., the condition can be denoted as being when the attribute becomes a specified value or is one of a list of specified values;

When attribute values are continuous in number, the condition can be denoted as being when the value reaches a threshold, rises above a threshold, or falls below a threshold. The threshold may be specified in absolute or relative terms.

In some embodiments, the condition may further include a delta threshold to control the subsequent notifications. For example, if the parameter of interest is the amount of load on the NF, the subscribing entity may desire to be notified when the load exceeds 50% (referred to herein as an "initial threshold") and to be further notified for every subsequent 5% increase in load (referred to herein as a "delta threshold"). This information would be useful for the subscribing entity to know, for example, so that it can shift traffic away from a heavily-loaded node and towards a more lightly loaded node. In some embodiments, the subscribing entity may also want to be notified when the load on a particular NF falls below a threshold, e.g., so that the subscribing entity knows that it can again send traffic to that particular NF.

In some embodiments, a subscribing entity may desire to be notified of changes to one parameter only if another parameter meets a particular condition, e.g., that it has a particular value or setting. In these embodiments, too, the subscribing entity may qualify the conditions of notification in terms of either or both parameters. Likewise, a subscribing entity may desire to be notified of changes to one or more parameters only if one or more other parameters meet particular conditions. Where the notification condition involves more than two parameters, e.g., "notify me of a change in parameter A only if parameter B satisfies condition X and/or parameter C satisfies condition Y" (and optionally, "and also if parameter A satisfies condition Z"), the subscribing entity may qualify the conditions of notification in terms of any or all parameters.

In one embodiment of the example above, a Representational State Transfer (REST)-based approach (also called a "RESTful approach") may be used to retrieve the load information of a service producer on demand, or to receive the change of load information and/or overload information per subscription. The RESTful approach is not limited to use with the load parameter but may be used with any parameter.

There are, proposed herein, various embodiments which address one or more of the issues disclosed herein. Certain embodiments may provide one or more of the following technical advantage(s). The mechanisms provided by the present disclosure can significantly reduce the signaling from the NRF to the subscribing entities, which can reduce the processing load at the subscribing entity by reducing the number of times the subscribing entity receives and processes notifications and eliminating the number of unwanted notifications received by the subscribing entity.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 4a is a flowchart that illustrates a method according to an embodiment of the present solution;

FIG. 4b is a flowchart that illustrates a method according to an embodiment of the present solution;

DETAILED DESCRIPTION

Figure 1:
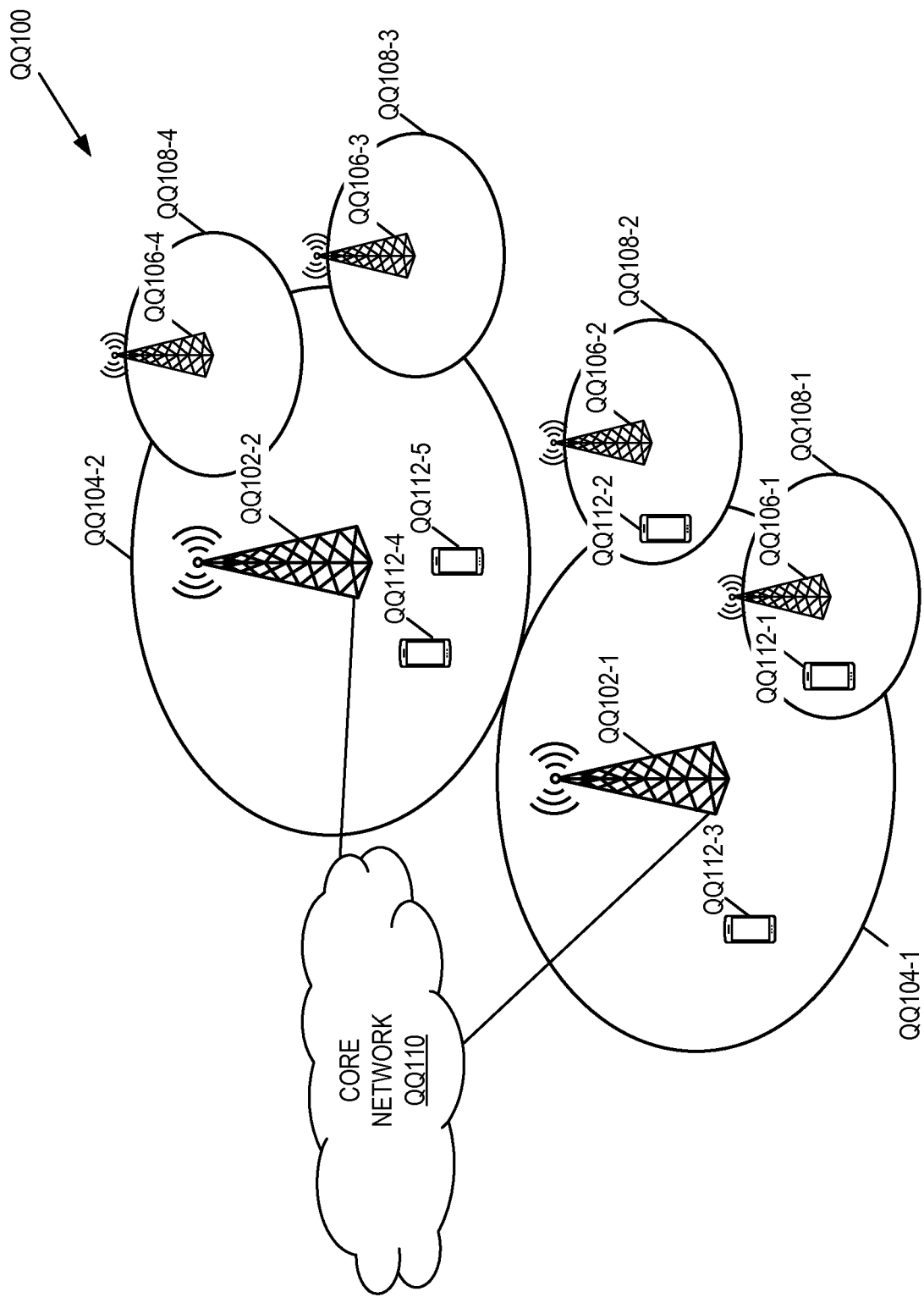
FIG. 1 illustrates an example of a cellular communications network QQ100 wherein embodiments of the present disclosure can be implemented.
Figure 2:
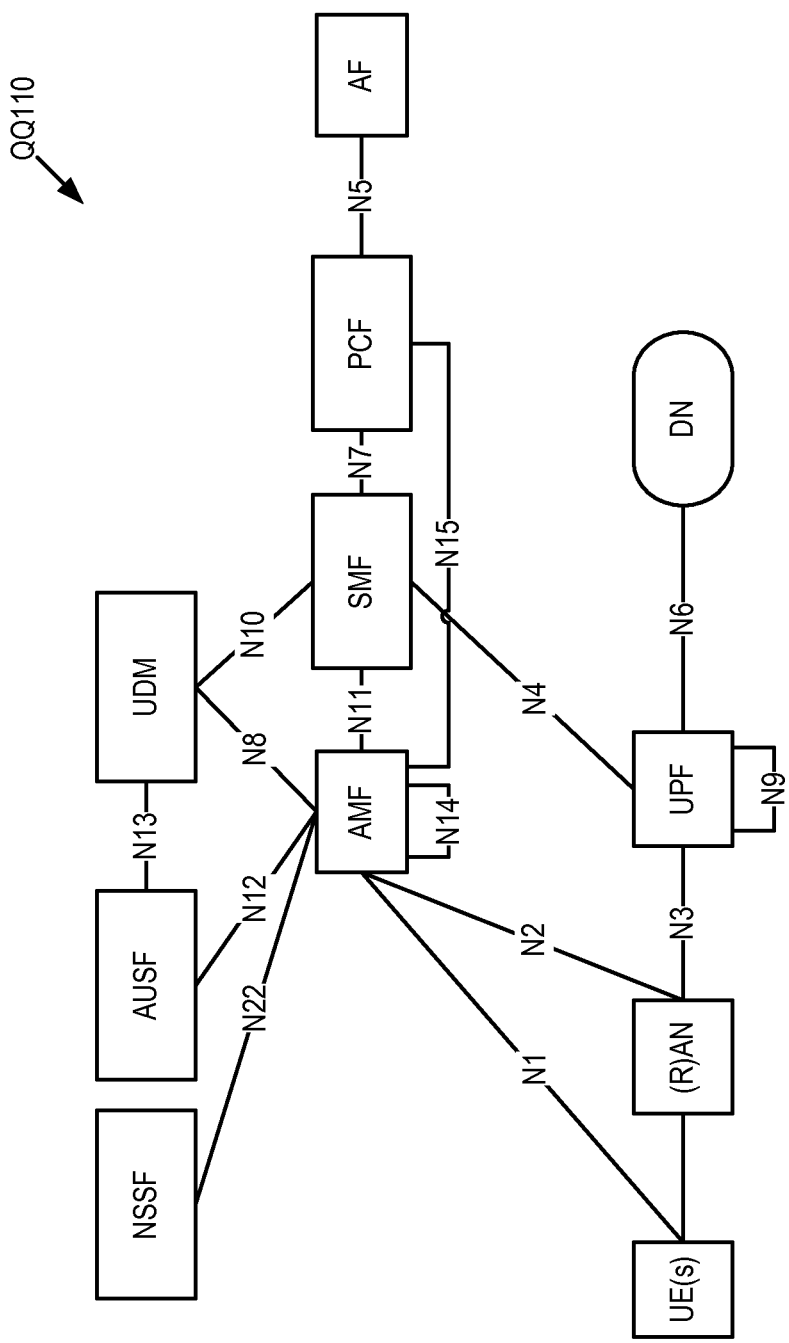
FIG. 2 illustrates a wireless communication system represented as a 5G network architecture.
Figure 3:
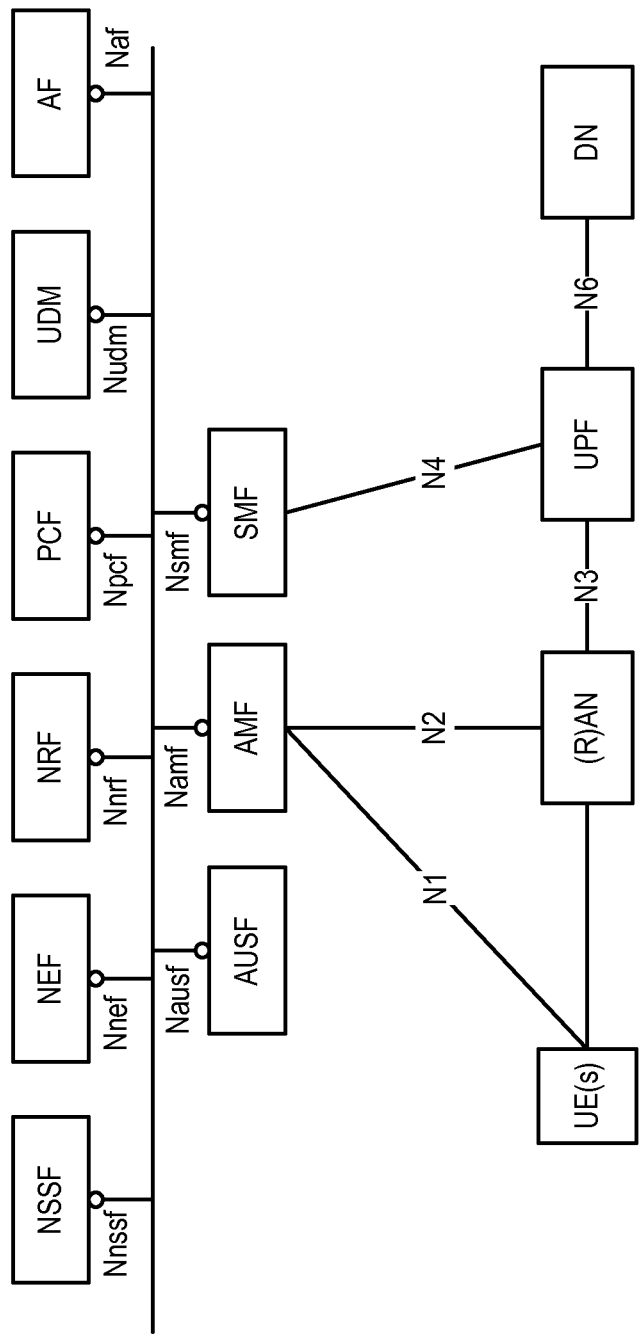
FIG. 3 illustrates a 5G network architecture that uses service-based interfaces between the NFs in the control plane.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a gNB in a 3GPP 5G NR network or an eNB in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (PGW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system. A network node may also be referred to as a network entity.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The subject matter of the present disclosure is an enhancement to the subscription to notifications of NF instances defined in TS 29.510, section 5.2.2.5, which discloses that the subscription to notifications on NF instances is executed creating a new individual resource under the collection resource "subscriptions." The operation is invoked by issuing a POST request on the Uniform Resource Identifier (URI) representing the "subscriptions" resource, as shown in the excerpt from TS 29.510, reproduced below:

Begin Excerpt From TS 29.510

1. The NF Service Consumer shall send a POST request to the resource URI representing the "subscriptions" collection resource. The request body shall include the data indicating the type of notifications that the NF Service Consumer is interested in receiving; it also contains a callback URI, where the NF Service Consumer shall be prepared to receive the actual notification from the NRF (see NFStatusNotify operation in 5.2.2.6) and it may contain a validity time, suggested by the NF Service Consumer, representing the time span during which the subscription is desired to be kept active.

2a. On success, "201 Created" shall be returned. The response shall contain the validity time, as determined by the NRF, after which the subscription becomes invalid. Once the subscription expires, if the NF Service Consumer wants to keep receiving status notifications, it shall create a new subscription in the NRF.

2b. If the creation of the subscription fails at the NRF due to errors in the SubscriptionData JSON object in the request body, the NRF shall return "400 Bad Request" status code with the ProblemDetails IE providing details of the error.

If the creation of the subscription fails at the NRF due to NRF internal errors, the NRF shall return "500 Internal Server Error" status code with the ProblemDetails IE providing details of the error.

End Excerpt From TS 29.510

According to some embodiments of the present disclosure, the SubscriptionData object is extended to include additional Information Elements (IEs) that are not currently defined within TS 29.510. What follows is an example of the changes that might be made to TS 29.510 to support the concepts and techniques according to some embodiments of the present disclosure. The changes are shown in bold, underlined font.

TABLE 6.1.6.2.16-1

(MODIFIED) Definition of type SubscriptionData

| Attribute name | Data type | P | Cardinality | Description |
| --- | --- | --- | --- | --- |
| nfStatusNotificationUri | Uri | M | 1 | Callback URI where the NF Service Consumer will receive the notifications from NRF. |
| subscriptionId | string | C | 0 . . . 1 | Subscription ID for the newly created resource. This parameter shall only be included by NRF in the response to the subscription creation request.<br>Read-Only: true |
| validityTime | DateTime | C | 0 . . . 1 | Time instant after which the subscription becomes invalid. This parameter may be sent by the client, as a hint to the server, but it shall be always sent back by the server (regardless of the presence of the attribute in the request) in the response to the subscription creation request. |
| reqNotifEvents | array(NotificationEventType) | O | 0 . . . N | If present, this attribute shall contain the list of event types that the NF Service Consumer is interested in receiving.<br>If this attribute is not present, it means that notifications for all event types are requested. |
| nfInstanceId | NfInstanceId | C | 0 . . . 1 | If present, this attribute contains the NF Instance ID of a specific NF Instance, whose status is requested to be monitored.<br>If this attribute is present, "nfType", "serviceName", "amfRegionId", "amfSetId" and "guamiList" shall be absent. |
| nfType | NFType | C | 0 . . . 1 | If present, this attribute contains the NF type of the NFs whose status is requested to be monitored.<br>If this attribute is present, "nfInstanceId" shall be absent. |
| serviceName | ServiceName | C | 0 . . . 1 | If present, this attribute contains the service name of those NFs that offer such service, whose status is requested to be monitored.<br>If this attribute is present, "nfInstanceId" shall be absent. |
| amfRegionId | string | C | 0 . . . 1 | If present, this attribute contains the AMF region identifier of the NFs whose status is requested to be monitored.<br>If this attribute is present, "nfInstanceId" shall be absent. |

TABLE 6.1.6.2.16-1-continued

| | | | | |
|---|---|---|---|---|
| amfSetId | string | C | 0 . . . 1 | If present, this attribute contains the AMF set identifier of those NFs having a certain "AMF Set ID" attribute in their profile, whose status is requested to be monitored.<br>If this attribute is present, "nfInstanceId" shall be absent. |
| guamiList | array(Guami) | C | 0 . . . N | If present, this attribute contains the GUAMI(s) of the AMFs whose status is requested to be monitored.<br>If this attribute is present, "nfInstanceId" shall be absent. |
| plmnId | PlmnId | O | 0 . . . 1 | If present, this attribute contains the target PLMN ID of the NF Instance(s) whose status is requested to be monitored. |
| monitoredAttributeList | array(string) | O | 0 . . . N | this attribute shall present when event type is "NF PROFILE CHANGED".<br>If present, it shall contain the list of JSON pointers to the attributes of target NF which are of interest,<br>If this attribute is not present, it means that notifications for all attributes types are requested. |
| changeFilterList | array(NfProfileChangeNotificationCondition) | O | 0 . . . N | this attribute may be present when event type is "NF PROFILE CHANGED".<br>If present, it shall contain conditions when the notification shall be sent upon a change of an attributes. |

NOTE 1:
At least one of the subscription conditions (nfInstanceID, nfType, serviceName, amfRegionId, amfSetId or guamiList) shall be present in the SubscriptionData object.
NOTE 2:
If both the amfRegionId and amfSetId attributes are present in the SubscriptionData, this indicates a subscription for notifications satisfying both attributes (i.e. notifications for NFs from that amfRegionId and amfSetId).

(NEW) Definition of type of NfProfileChangeNotificationCondition

| Attribute name | Data type | P | Cardinality | Description |
|---|---|---|---|---|
| attribute | string | M | 1 | This IE shall contain carry a JSON pointer to an attribute of the NF profile, to which the condition(s) shall be applied. |
| conditions | array(ChangeCondition) | M | 1 . . . N | This IE shall indicate under which condition(s), the change of the attribute shall be reported with a notification. |
| conditionDefinition | Condition Definition | M | 1 | The IE shall be present if the change condition is NumberChangeCondition, BooleanChangeCondition and StringChangeCondition. |

(NEW) Definition of type of ChangeCondition as a list of "mutually exclusive alternatives".

| Enumeration value | Description |
|---|---|
| "PresenceChangeCondition" | Indicates condition of presence of the attribute changed. |
| "NumberValueChangeCondition" | Indicates condition of a number value change. |
| "BooleanValueChangeCondition" | Indicates condition of a Boolean value change. |
| "StringChangeCondition" | Indicates condition of an enumeration type value change. |

(NEW) Definition of type ConditionDefinition

| | | | | |
|---|---|---|---|---|
| mathRelationOperator | array(string) | O | 1 | This IE shall be present when condition is NumberValueChangeCondition. The string may be "LESS THAN", "LARGER THAN", "EQUAL" |
| threshold | integer | O | 1 | This IE shall be present when condition is NumberValueChangeCondition, indicates the value that triggering to send first notification |
| deltaThreshold | integer | O | | This IE shall be present when condition is NumberValueChangeCondition, indicates the delta value in variation to trigger to send subsequent notification. |
| boolValue | boolean | O | 1 | Indicates the value of a Boolean attribute |
| stringValue | string | O | 1 | Contains the value of a string attribute. String condition can also be used for enumeration data types, because enumeration values in JSON is defined as strings. |

In some embodiments, the monitoredAttributeList and changeFilterList parameters may not be present at the same time. In other embodiments, these two parameters may coexist, where one of the two takes priority over the other of the two in the event that both refer to the same parameter.

The following is an example of how the concepts described in the present disclosure might be implemented according to a protocol:

```
{
    "nfStatusNotificationUri": "https://example.com/callbacks/01234",
    "validityTime": "2018-12-31T23:59:59.999Z",
    "reqNotifEvents": [ "NF_PROFILE_CHANGED" ],
    "subscriptionCondition": {
        "nfInstanceId": "4ad20e99-91fa-4df4-b993-1be879d4c478"
    },
    "notificationCondition": {
        "notifyAll": false,
        "conditions": [
            {
                "member": "/load",
                "operator": "gte",
                "value": 80,
                "oneTime": true
            },
            {
                "member": "/nfServices/*/nfServiceStatus",
                "operator": "regex",
                "value": "^SUSPENDED$",
                "oneTime": false
            }
        ]
    }
}
```

In the example above, an NRF is provided with the list of conditions of a particular NF instance—identified by its nfInstanceId of "4ad20e99-91fa-1be879d4c478"—for which the subscribing entity desires to receive a notification; namely, that the subscribing entity wants to be notified:

the first time that the load on that NF instance is greater than or equal to 80%; and any time that any parameter having a name that matches the regular expression "/nfServices/*/nfServiceStatus" changes to "SUSPENDED" mode (e.g., if any of the available services goes into suspended mode).

The example above and other examples presented herein are illustrative and not limiting.

FIG. 4a is a flowchart illustrating an exemplary method for providing notifications for a subscription to monitor changes of a NF profile of a monitored network entity (e.g. a core network entity, e.g. a core network control plane entity such as a NSSF, NEF, PCF, UDM, AUSF, AMF or SMF, or a core network user plane entity such as a UPF) according to some embodiments of the present disclosure. Preferably, the NF profile comprise a set of attributes, e.g. attributes such as those that are identified by Attribute names in the tables from TS 29.510 cited above. In the embodiment illustrated in FIG. 4a, the method includes the following steps, which may be performed at a repository network entity (e.g. such as an NRF or similar) for providing notifications (e.g. conditional notifications) for a subscription to monitor changes of a NF profile of a monitored network entity.

At step IVD100, the repository network entity receives, from a subscribing network entity (e.g. another core network entity, e.g. another core network control plane entity or another core network user plane entity), a subscription request to monitor changes to a NF profile of at least one monitored network entity, the request comprising a notification preference that identifies a subset of attributes in the NF Profile to be monitored or to be excluded from monitoring, or a combination of the above. Optionally, the notification preference may include a set of conditions which must be satisfied before notification of the change to the NF profile will be sent.

At step IVD102, the network entity provides, to the subscribing network entity, notifications of changes to the identified subset of attributes in the NF profile of the at least one monitored network entity according to the notification preference.

FIG. 4b is a flowchart illustrating an exemplary method for subscribing to notifications of changes to a NF profile of monitored network entity according to some embodiments of the present disclosure. Preferably, the NF profile comprise a set of attributes, e.g. attributes that are identified by Attribute names in the tables from TS 29.510 cited above. In the embodiment illustrated in FIG. 4b, the method includes the following steps, which may be performed at a subscribing network entity (e.g. a core network entity, e.g. a core network control plane entity such as a NSSF, NEF, PCF, UDM, AUSF, AMF or SMF, or a core network user plane entity such as a UPF) within a telecommunications network, for subscribing to notifications of changes of a NF profile of a monitored network entity (e.g. another core network entity, e.g. another core network control plane entity or another core network user plane entity).

At step IVD200, the subscribing network entity sends, to a repository network entity (e.g. a NRF or similar), a subscription request to subscribe to monitor changes of a NF profile of at least one monitored network entity, the request comprising a notification preference that identifies a subset of attributes in the NF Profile to be monitored or to be excluded from monitoring, or a combination of the above. Optionally, the notification preference may include a set of conditions which must be satisfied before notification of the change to the NF profile will be sent.

At step IVD202, the entity receives, from the repository network entity, notifications of changes to the identified subset of attributes in the NF profile of the at least one monitored network entity according to the notification preference.

In both FIGS. 4a and 4b, in some embodiments, the notification preference specifies a set of conditions that must be satisfied before notification of an attribute change is to be sent. For example, the notification preference may indicate that the subscribing entity desires to be notified of any change to attribute X but desires to be notified only if attribute Y changes by more than some amount, e.g., Z percent. In some embodiments, the at least one NF, the profiles of which the subscribing entity desires to monitor, may be identified by name or other identifier, by function, by geographical location, or other identifying means, either explicitly or by a matching pattern or regular expression. Likewise the attributes s to be monitored and/or ignored may be identified explicitly or by a matching pattern or regular expression. In some embodiments, notifications of changes of a first attribute may be conditioned upon the state or value of a second attribute. It will be understood that the conditions for notification may be complex or multi-factored, and that the conditions may be described in terms of mathematical (e.g., greater than, less than, equal to, inside or outside a range of values), Boolean (e.g., and, or, not), and/or logical (e.g., if . . . then . . . else, while . . . do, for each item in list so) expressions.

Figure 4C:
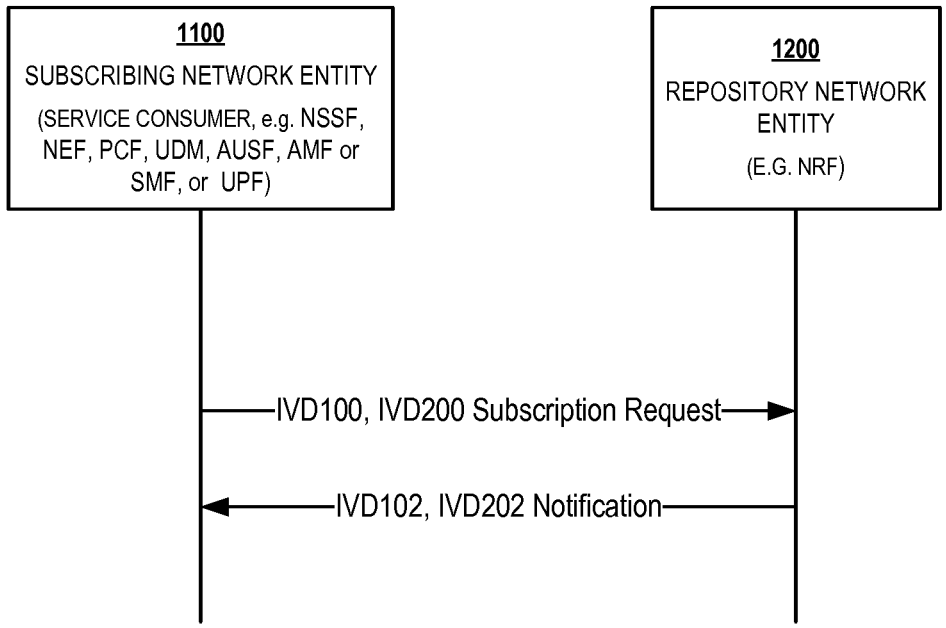
FIG. 4c is a signaling diagram that corresponds to the flowcharts in FIGS. 4a and 4b.
Figure 9:
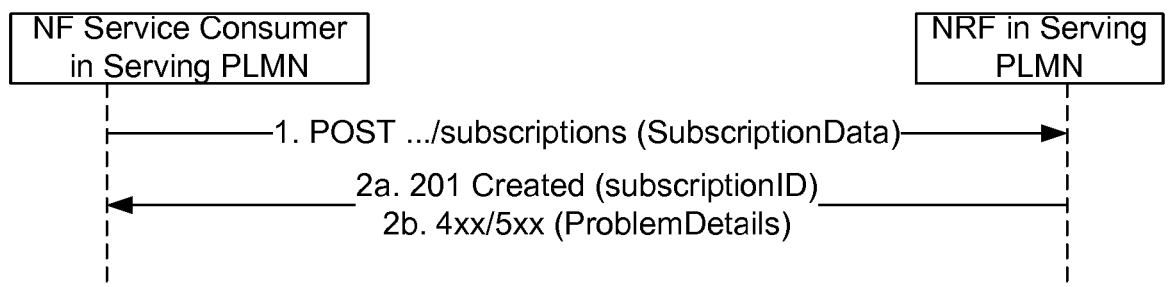
FIG. 9 shows an excerpt of TS 29.501, FIG. 5.2.2.5.2-1: Subscription to NF Instances in the same PLMN.

FIG. 4c is a signaling diagram that corresponds to the flowcharts in FIGS. 4a and 4b.

Figure 5A:
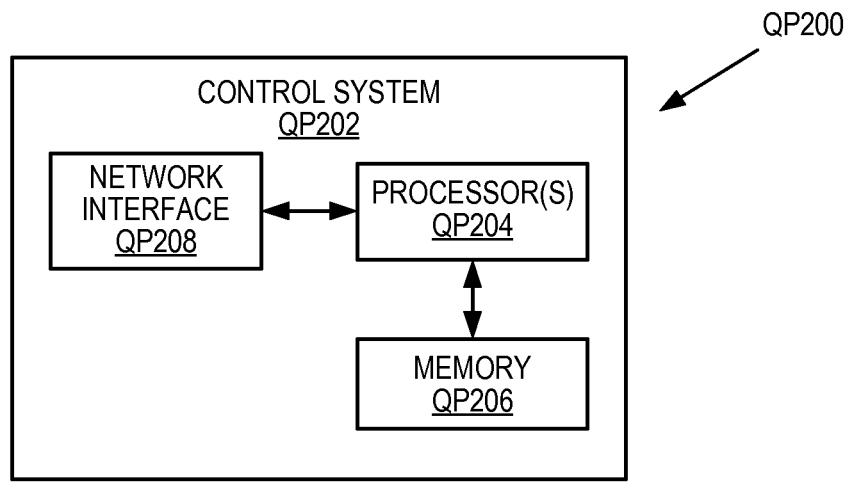
FIG. 5a is a schematic block diagram of a radio access node.

FIG. 5a is a schematic block diagram of a network entity QP200 according to some embodiments of the present disclosure. The network entity may be, for example, a core network entity, e.g. a core network control plane entity such as a NSSF, NEF, PCF, UDM, AUSF, AMF or SMF, or a core network user plane entity such as a UPF. As illustrated, the network entity includes a control system QP202 that includes one or more processors Qp204 (e.g., Central Processing Units (CPUs), Application Specific Integrated Circuits (ASICs), Field Programmable Gate Arrays (FPGAs), and/or the like), memory Qp206, and a network interface Qp208. The one or more processors Qp204 are also referred to herein as processing circuitry. The one or more processors QP204 operate to provide one or more functions of a network entity QP200 as described herein. In some embodiments, the function(s) are implemented in software that is stored, e.g., in the memory QP206 and executed by the one or more processors QP204.

Figure 5B:
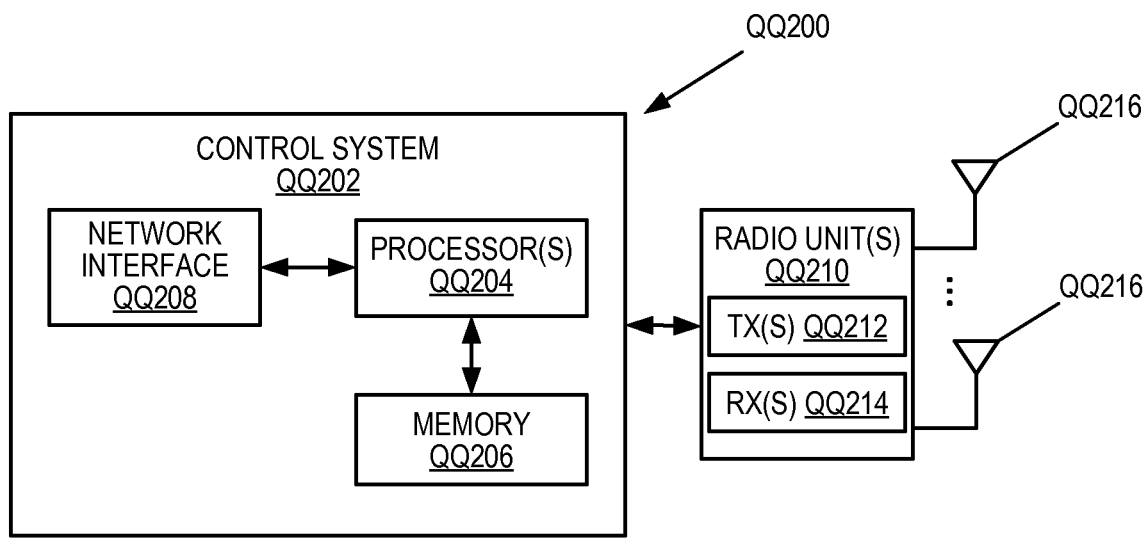
FIG. 5b is a schematic block diagram of a network entity.

FIG. 5b is a schematic block diagram of a radio access node QQ200 according to some embodiments of the present disclosure. The radio access node QQ200 may be, for example, a base station QQ102 or QQ106. As illustrated, the radio access node QQ200 includes a control system QQ202 that includes one or more processors QQ204 (e.g., Central Processing Units (CPUs), Application Specific Integrated Circuits (ASICs), Field Programmable Gate Arrays (FPGAs), and/or the like), memory QQ206, and a network interface QQ208. The one or more processors QQ204 are also referred to herein as processing circuitry. In addition, the radio access node QQ200 includes one or more radio units QQ210 that each includes one or more transmitters QQ212 and one or more receivers QQ214 coupled to one or more antennas QQ216. The radio units QQ210 may be referred to or be part of radio interface circuitry. In some embodiments, the radio unit(s) QQ210 is external to the control system QQ202 and connected to the control system QQ202 via, e.g., a wired connection (e.g., an optical cable). However, in some other embodiments, the radio unit(s) QQ210 and potentially the antenna(s) QQ216 are integrated together with the control system QQ202. The one or more processors QQ204 operate to provide one or more functions of a radio access node QQ200 as described herein. In some embodiments, the function(s) are implemented in software that is stored, e.g., in the memory QQ206 and executed by the one or more processors QQ204.

Figure 6:
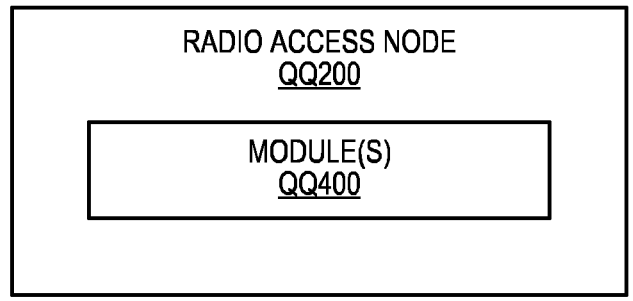
FIG. 6 is a schematic block diagram of a radio access node.

FIG. 6 is a schematic block diagram of the radio access node QQ200 according to some other embodiments of the present disclosure. The radio access node QQ200 includes one or more modules QQ400, each of which is implemented in software. The module(s) QQ400 provide the functionality of the radio access node QQ200 described herein.

Figure 7:
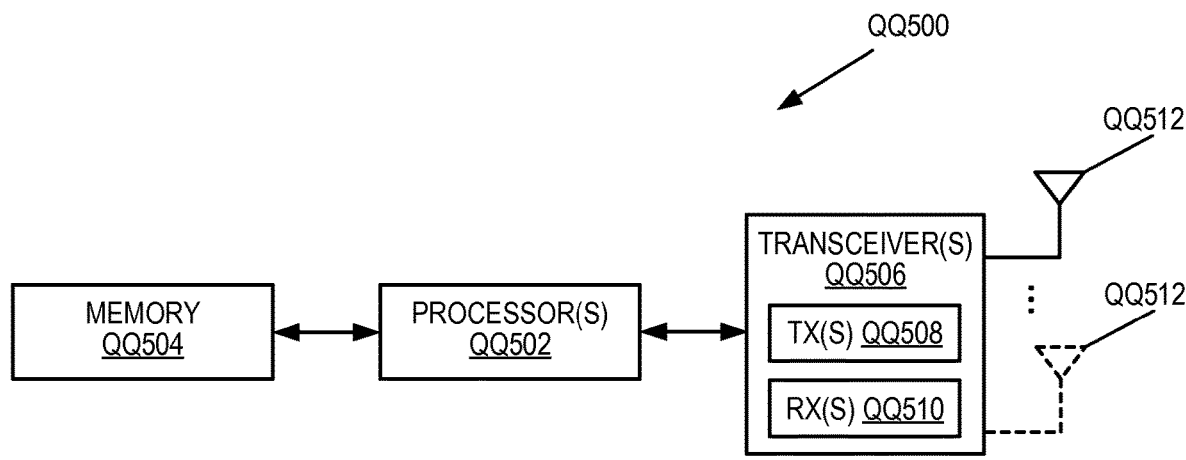
FIG. 7 is a schematic block diagram of a UE.

FIG. 7 is a schematic block diagram of a UE QQ500 according to some embodiments of the present disclosure. As illustrated, the UE QQ500 includes one or more processors QQ502 (e.g., CPUs, ASICs, FPGAs, and/or the like), memory QQ504, and one or more transceivers QQ506 each including one or more transmitters QQ508 and one or more receivers QQ510 coupled to one or more antennas QQ512. The transceiver(s) QQ506 includes radio-front end circuitry connected to the antenna(s) QQ512 that is configured to condition signals communicated between the antenna(s) QQ512 and the processor(s) QQ502, as will be appreciated by on of ordinary skill in the art. The processors QQ502 are also referred to herein as processing circuitry. The transceivers QQ506 are also referred to herein as radio circuitry. In some embodiments, the functionality of the UE QQ500 described above may be fully or partially implemented in software that is, e.g., stored in the memory QQ504 and executed by the processor(s) QQ502. Note that the UE QQ500 may include additional components not illustrated in FIG. 5 such as, e.g., one or more user interface components (e.g., an input/output interface including a display, buttons, a touch screen, a microphone, a speaker(s), and/or the like and/or any other components for allowing input of information into the UE QQ500 and/or allowing output of information from the UE QQ500), a power supply (e.g., a battery and associated power circuitry), etc.

In some embodiments, a computer program including instructions which, when executed by at least one processor, causes the at least one processor to carry out the functionality of the UE QQ500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
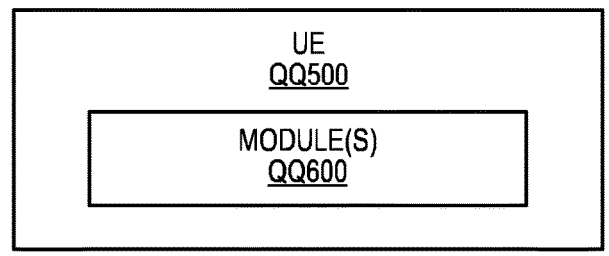
FIG. 8 is a schematic block diagram of a UE.

FIG. 8 is a schematic block diagram of the UE QQ500 according to some other embodiments of the present disclosure. The UE QQ500 includes one or more modules QQ600, each of which is implemented in software. The module(s) QQ600 provide the functionality of the UE QQ500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

SUMMARY OF SOME EMBODIMENTS

Some of the embodiments that have been described above may be summarized in the following manner:

Group A Embodiments—NRF

1. A method, performed by a repository network entity (e.g. a NRF entity or similar) within a telecommunications network, for providing notifications (e.g. conditional notifications) for a subscription to monitor changes of a Network Function, NF, profile of a monitored network entity (e.g. a core network entity, e.g. a core network control plane entity such as a NSSF, NEF, PCF, UDM, AUSF, MF or SMF, or a core network user plane entity such as a UPF), the method comprising:

receiving, from a subscribing network entity, a subscription request to subscribe to monitor changes to a NF profile of at least one monitored network entity, the request comprising a notification preference that identifies a subset of attributes in the NF profile to be monitored or to be excluded from monitoring; and providing, to the subscribing network entity, notifications of changes to the identified subset of attributes of the NF profile of the at least one monitored network entity.

2. The method of embodiment 1 wherein the repository network entity comprises a NF Repository Function, NRF.

3. The method of any of embodiments 1 or 2 wherein the notification preference identifies, for at least one monitored attribute, a condition which a changed attribute must satisfy before a notification is provided to the subscribing network entity.

4. The method of embodiment 3 wherein the condition which a changed attribute must satisfy before a notification is provided to the subscribing network entity comprises a condition that the attribute has changed:
to a specified numeric, string, or Boolean value;
to a value or by a percentage that is equal to a threshold number;
to a value or by a percentage that is larger than a threshold number;
to a value or by a percentage that is smaller than a threshold number;
to a value or by a percentage that is within a defined range;
to a value or by a percentage that is outside of a defined range; or
to a value that matches a matching condition or regular expression value.

5. The method of any of embodiments 1-4 wherein the notification preference identifies a condition that must exist for one attribute before a notification of a change of another attribute is provided to the subscribing network entity.

6. The method of any of embodiments 1-5 wherein providing the set of one or more notification preferences comprises identifying the attribute by name, identifier, matching condition, regular expression value, or some combination of the above.

7. The method of any of embodiments 1-6 wherein the request to subscribe to changes to a NF profile of an identified set of one or more NFs identifies at least one of the one or more NFs by name, identifier, matching condition, regular expression value, or some combination of the above.

8. The method of any of embodiments 1-7 wherein the subscribing network entity comprises a core network NF other than the network entity receiving the request to subscribe to changes.

Group B Embodiments—Subscriber to NRF Notifications

9. A method, performed by a subscribing network entity (e.g. a core network entity, e.g. a core network control plane entity such as a NSSF, NEF, PCF, UDM, AUSF, MF or SMF, or a core network user plane entity such as a UPF) within a telecommunications network, for subscribing to notifications of changes of a Network Function, NF, profile of a monitored network entity (e.g. another core network entity, e.g. another core network control plane entity or another core network user plane entity), the method comprising:

sending, to a repository network entity (e.g. a NRF entity or similar), a subscription request to subscribe to monitor changes to a NF profile of at least one monitored network entity, the request comprising a notification preference that identifies a subset of attributes of the NF profile to be monitored or to be excluded from monitoring; and receiving, from the repository network entity, notifications of changes to the identified subset of profile attributes of the NF profile of the at least one monitored network entity.

10. The method of embodiment 9 wherein the repository network entity comprises an NF Repository Function, NRF.

11. The method of any of embodiments 9 or 10 wherein a notification preference identifies, for at least one monitored attribute, a condition which a changed attribute must satisfy before a notification shall be provided to the subscribing network entity.

12. The method of embodiment 11 wherein the condition which a changed attribute must satisfy before a notification shall be provided to the subscribing network entity comprises a condition that the attribute has changed:
to a specified numeric, string, or Boolean value;
to a value or by a percentage that is equal to a threshold number;
to a value or by a percentage that is larger than a threshold number;
to a value or by a percentage that is smaller than a threshold number;
to a value or by a percentage that is within a defined range;
to a value or by a percentage that is outside of a defined range; or
to a value that matches a matching condition or regular expression value.

13. The method of any of embodiments 9-12 wherein the notification preference identifies a condition that must exist for one attribute before a notification of a change of another attribute shall be provided to the subscribing network entity.

14. The method of any of embodiments 9-13 wherein providing the set of one or more notification preferences comprises identifying the attribute by name, identifier, matching condition, regular expression value, or some combination of the above.

15. The method of any of embodiments 9-14 wherein the request to subscribe to changes to a NF profile of an identified set of one or more NFs identifies at least one of the one or more NFs by name, identifier, matching condition, regular expression value, or some combination of the above.

16. The method of any of embodiments 9-15 wherein the entity within the telecommunications network comprises a core network NF other than the network entity for providing notifications of profile changes of the NF.

Group C Embodiments

17. A repository network entity for operating within a telecommunications network and for providing notifications for a subscription to monitor changes of a Network Function, NF, profile of a monitored network entity, the repository network entity comprising processing circuitry configured to perform the steps of:

receive, from a subscribing network entity, a subscription request to subscribe to monitor changes to a NF profile of at least one monitored network entity, the request comprising a notification preference that identifies a subset of attributes in the NF profile to be monitored or to be excluded from monitoring; and provide, to the subscribing network entity, notifications of changes to the identified subset of attributes of the NF profile of the at least one monitored network entity.

18. A subscribing network entity for operating within a telecommunications network and for subscribing to notifications of changes of a Network Function, NF, profile of a monitored network entity, the subscribing network entity comprising processing circuitry configured to perform the steps of:

send, to a repository network entity, a subscription request to subscribe to monitor changes to a NF profile of at least one monitored network entity, the request comprising a notification preference that identifies a subset of attributes in the NF profile to be monitored or to be excluded from monitoring; and receive, from the repository network entity, notifications of changes to the identified subset of attributes of the NF profile of the at least one monitored network entity.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AF Application Function
AMF Access and Mobility Management Function
AN Access Network
AP Access Point
ASIC Application Specific Integrated Circuit
AUSF Authentication Server Function
CPU Central Processing Unit
DN Data Network
DNN Data Network Name
DNS Domain Name System
DSP Digital Signal Processor
eNB Enhanced or Evolved Node B
FPGA Field Programmable Gate Array
FQDN Fully Qualified Domain Name
gNB New Radio Base Station
ID Identifier/Identity
IE Information Element
IP Internet Protocol
Ipv4Addr Internet Protocol Version 4 Address
Ipv6Addr Internet Protocol Version 6 Address
JSON JavaScript Object Notation
LTE Long Term Evolution
MME Mobility Management Entity
MTC Machine Type Communication
NEF Network Exposure Function
NF Network Function
NR New Radio
NRF Network Function Repository Function
NSI Network Slice Instance
NSSAI Network Slice Selection Assistance Information
NSSF Network Slice Selection Function
OTT Over-the-Top
PCF Policy Control Function
PGW Packet Data Network Gateway
PLMN Public Land Mobile Network
QoS Quality of Service
RAM Random Access Memory
RAN Radio Access Network
REST Representational State Transfer
ROM Read Only Memory
RRH Remote Radio Head
RTT Round Trip Time
SBA Service Based Architecture
SBI Service Based Interface
SCEF Service Capability Exposure Function
SMF Session Management Function
S-NSSAI Single Network Slice Selection Assistance Information
SUPI Subscriber Permanent Identifier
TAI Tracking Area Identity
TS Technical Specification
UDM Unified Data Management
UDR Unified Data Repository
UE User Equipment
UPF User Plane Function
URI Uniform Resource Identifier

The invention claimed is:

1. A method, performed by a repository network entity within a telecommunications network, for providing notifications for a subscription to monitor changes of a Network Function, NF, profile of a monitored network entity where the NF profile comprises a set of attributes, the method comprising:

receiving, from a subscribing network entity, a subscription request to subscribe to monitor changes to the attributes of a NF profile of the monitored network entity, the subscription request comprising a notification preference that identifies a subset of the attributes in the NF profile to be excluded from monitoring as not being of interest to the subscribing network entity while the other attributes in the NF profile are of interest to the subscribing network entity; and providing, to the subscribing network entity, notifications of changes to the attributes of the NF profile of the monitored network entity when any attribute of interest to the subscribing network entity has changed.

2. The method of claim 1 wherein the repository network entity comprises a NF Repository Function, NRF.

3. The method of claim 1 wherein the notification preference identifies, for at least one monitored attribute, a condition which a changed attribute must satisfy before a notification is provided to the subscribing network entity.

4. The method of claim 3 wherein the condition which a changed attribute must satisfy before a notification is provided to the subscribing network entity comprises a condition that the attribute has changed:

to a specified numeric, string, or Boolean value;
to a value or by a percentage that is equal to a threshold number;
to a value or by a percentage that is larger than a threshold number;
to a value or by a percentage that is smaller than a threshold number;
to a value or by a percentage that is within a defined range;
to a value or by a percentage that is outside of a defined range; or
to a value that matches a matching condition or regular expression value.

5. The method of claim 1 wherein the notification preference identifies a condition that must exist for one attribute before a notification of a change of another attribute is provided to the subscribing network entity.

6. The method of claim 1 wherein the notification preference identifying the attribute by name, identifier, matching condition, regular expression value, or some combination of the above.

7. The method of claim 1 wherein the request to subscribe to changes to a NF profile of an identified set of one or more NFs identifies at least one of the one or more NFs by name, identifier, matching condition, regular expression value, or some combination of the above.

8. The method of claim 1 wherein the subscribing network entity comprises a core network NF other than the network entity receiving the request to subscribe to changes.

9. A method, performed by a subscribing network entity within a telecommunications network, for subscribing to notifications of changes of a Network Function, NF, profile of a monitored network entity where the NF profile comprises a set of attributes, the method comprising:
  sending, to a repository network entity, a subscription request to subscribe to monitor changes to the attributes of a NF profile of the monitored network entity, the subscription request comprising a notification preference that identifies a subset of the attributes of the NF profile to be excluded from monitoring as not being of interest to the subscribing network entity while the other attributes in the NF profile are of interest to the subscribing network entity; and
  receiving, from the repository network entity, notifications of changes to the attributes of the NF profile of the monitored network entity when any attribute of interest to the subscribing network entity has changed.

10. The method of claim 9 wherein the repository network entity comprises an NF Repository Function, NRF.

11. The method of claim 9 wherein a notification preference identifies, for at least one monitored attribute, a condition which a changed attribute must satisfy before a notification shall be provided to the subscribing network entity.

12. The method of claim 11 wherein the condition which a changed attribute must satisfy before a notification shall be provided to the subscribing network entity comprises a condition that the attribute has changed:
  to a specified numeric, string, or Boolean value;
  to a value or by a percentage that is equal to a threshold number;
  to a value or by a percentage that is larger than a threshold number;
  to a value or by a percentage that is smaller than a threshold number;
  to a value or by a percentage that is within a defined range;
  to a value or by a percentage that is outside of a defined range; or
  to a value that matches a matching condition or regular expression value.

13. The method of claim 9 wherein the notification preference identifies a condition that must exist for one attribute before a notification of a change of another attribute shall be provided to the subscribing network entity.

14. The method of claim 9 wherein the notification preference identifying the attribute by name, identifier, matching condition, regular expression value, or some combination of the above.

15. The method of claim 9 wherein the request to subscribe to changes to a NF profile of an identified set of one or more NFs identifies at least one of the one or more NFs by name, identifier, matching condition, regular expression value, or some combination of the above.

16. The method of claim 9 wherein the entity within the telecommunications network comprises a core network NF other than the network entity for providing notifications of profile changes of the NF.

17. A repository network entity for operating within a telecommunications network and for providing notifications for a subscription to monitor changes of a Network Function, NF, profile of a monitored network entity where the NF profile comprises a set of attributes, the repository network entity comprising processing circuitry configured to perform the steps of:
  receive, from a subscribing network entity, a subscription request to subscribe to monitor changes to the attributes of a NF profile of the monitored network entity, the subscription request comprising a notification preference that identifies a subset of the attributes in the NF profile to be excluded from monitoring as not being of interest to the subscribing network entity, while the other attributes in the NF profile are of interest to the subscribing network entity; and
  provide, to the subscribing network entity, notifications of changes to the attributes of the NF profile of the monitored network entity when any attribute of interest to the subscribing network entity has changed.

18. A subscribing network entity for operating within a telecommunications network and for subscribing to notifications of changes of a Network Function, NF, profile of a monitored network entity where the NF profile comprises a set of attributes, the subscribing network entity comprising processing circuitry configured to perform the steps of:
  send, to a repository network entity, a subscription request to subscribe to monitor changes to the attributes of a NF profile of the monitored network entity, the subscription request comprising a notification preference that identifies a subset of the attributes in the NF profile to be excluded from monitoring as not being of interest to the subscribing network entity, while the other attributes in the NF profile are of interest to the subscribing network entity; and
  receive, from the repository network entity, notifications of changes to the attributes of the NF profile of the monitored network entity when any attribute of interest to the subscribing network entity has changed.

\* \* \* \* \*

UNITED STATES PATENT AND TRADEMARK OFFICE
CERTIFICATE OF CORRECTION

| | |
|---|---|
| PATENT NO. | : 11,683,384 B2 |
| APPLICATION NO. | : 17/282802 |
| DATED | : June 20, 2023 |
| INVENTOR(S) | : Yang et al. |

It is certified that error appears in the above-identified patent and that said Letters Patent is hereby corrected as shown below:

In the Drawings

In Fig. 4b, Sheet 4 of 7, for Tag "IVD202", in Line 1, delete "ENTIRY," and insert -- ENTITY, --, therefor.

In the Specification

In Column 21, Line 63, delete "on" and insert -- one --, therefor.

Signed and Sealed this
Seventh Day of November, 2023

Katherine Kelly Vidal
*Director of the United States Patent and Trademark Office*